No. 788,406. PATENTED APR. 25, 1905.
C. W. HOWE.
ANIMAL TRAP.
APPLICATION FILED DEC. 9, 1904.
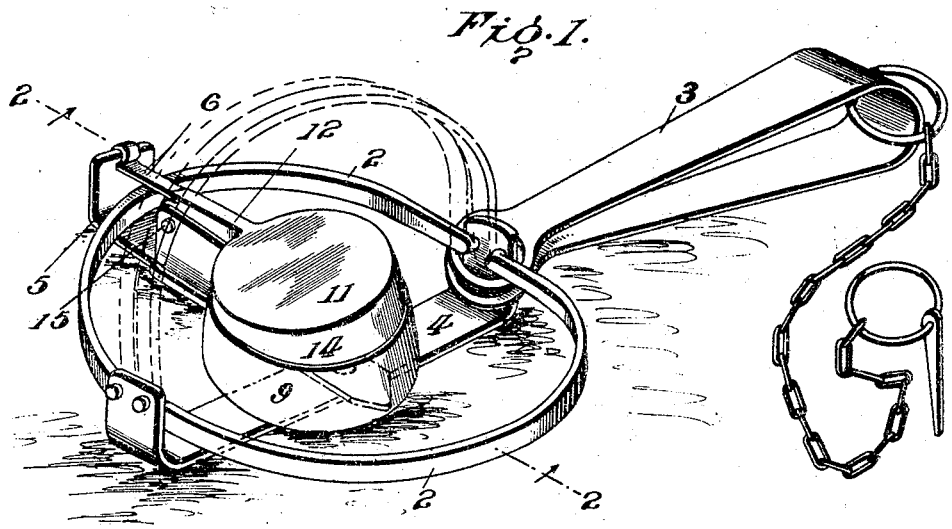
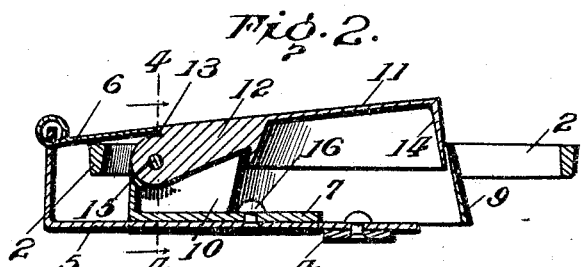
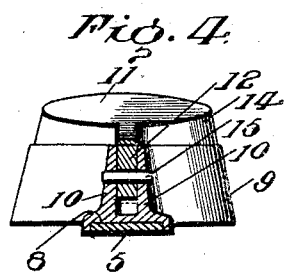
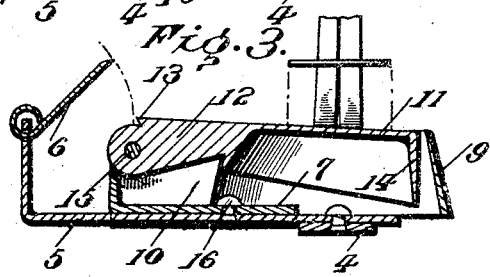
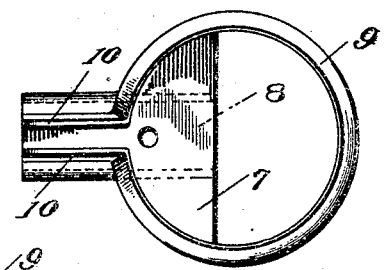
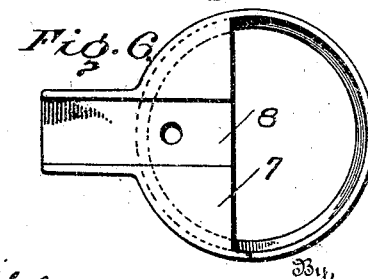
Witnesses
Jno Mirie
W. A. Williams
Inventor
Charles W. Howe.
By Simon Lyon
Attorney No. 788,406. Patented April 25, 1905.

UNITED STATES PATENT OFFICE.

CHARLES WESLEY HOWE, OF OMEGA, ALABAMA.

ANIMAL-TRAP.

SPECIFICATION forming part of Letters Patent No. 788,406, dated April 25, 1905.

Application filed December 9, 1904. Serial No. 236,140.

*To all whom it may concern:*

Be it known that I, CHARLES WESLEY HOWE, a citizen of the United States, residing at Omega, Bullock county, State of Alabama, have invented certain new and useful Improvements in Animal-Traps; and I do hereby declare the following to be a full, clear, and exact description of the invention, such as will enable others skilled in the art to which it appertains to make and use the same.

This invention relates to certain improvements in animal-traps, particularly to traps of the spring-jaw type; and the objects and nature of my invention will be readily understood by those skilled in the art in view of the following explanation of the construction shown in the accompanying drawings.

My invention consists in certain novel features in construction and in combinations and arrangements of parts, as more fully and particularly pointed out and described hereinafter.

Referring to the accompanying drawings, Figure 1 is a perspective view of a spring-jaw trap having my invention applied thereto. Fig. 2 is a cross-section on the line 2 2, Fig. 1. Fig. 3 is a section corresponding to the section of Fig. 2, but showing the treadle or pan and its lever in the position assumed on the release or tripping of the latch. Fig. 4 is a section on the line 4 4, Fig. 2. Fig. 5 is a detail top plan view of the treadle frame and guard. Fig. 6 is a bottom plan of said treadle frame and guard.

In the drawings, 2 are the jaws of a trap, and 3 is the operating-spring. In the example illustrated the main frame of the trap is T-shaped and consists of the bottom bar or plate 4, arranged longitudinally of the trap and carrying the jaws, and the lateral horizontal bar or plate 5 at its inner portion resting on and rigidly secured to the central portion of the bar 4 and at its outer end having the vertical portion or post.

6 is the vertically-swinging latch, at its outer end pivoted to the upper end of said vertical portion. The latch is of any ordinary or suitable construction, operating, as usual, to hold the jaws open and to release the same when the trap is sprung.

My improvement is embodied in a peculiar treadle frame and guard and in the manner of mounting or arranging the treadle therein. The treadle frame and guard is preferably cast or otherwise formed in one piece of metal and consists of the horizontal bottom web or floor 7, formed on its under face with a longitudinal socket 8, having parallel longitudinal edge walls or flanges, and the vertical approximately circular guard-wall 9, at its ends terminating in the vertical parallel separated walls 10. The walls 9 and 10 extend vertically from the bottom web 7, which spans the space between the walls 10 and closes the same at the bottom and spans a portion of the space within the approximately annular wall 9. The front portion of the treadle frame and guard—that is, the portion diametrically opposite the walls 10—is usually left open at the bottom. The treadle consists of a pan or plate 11 and a lever, arm, or shank 12, rigid therewith and projecting about radially therefrom. The outer end of the arm 12 is formed with the tooth, notch, or shoulder 13 to engage the free end of the latch 6 and lock the same against vertical movement, holding the trap-jaws depressed in set position.

The plate or pan 11 of the treadle is formed with an annular flange 14, depending from the outer edge of the plate. This flange is preferably tapered or reduced downwardly to form its lower edge approximately sharp. The flange also preferably increases in vertical width from the rear of the plate to the front thereof—that is, the flange is of greater length or width at the front or free end of the treadle and gradually reduces in length toward the rear or portion thereof embodying the arm. The treadle is arranged within said treadle frame and guard to move vertically therein and to cover and close at the top the space within said frame. The arm of the treadle extends longitudinally between the walls 10 and closes the space between the same and is fulcrumed thereto in any suitable manner, as by the pin 15 passing through said walls and the lower portion of the rear end of the arm. The plate of the treadle covers the space within the annular wall 9, and the annular flange or apron 14 of said plate fits down within and always closes said space. The annular wall 9 preferably tapers upwardly and is beveled upwardly to a top sharp or thin edge to deflect sand or other material outwardly and prevent the same wedging between the wall and the flange. The walls 10 are arranged closely on opposite sides of the arm of the treadle and prevent foreign material or obstructions from moving under said arm or in any way interfering with the free vertical movement thereof. The space under said arm is also closed, preventing foreign material and obstructions from collecting under the arm from beneath.

The trigger or treadle frame and guard carries the treadle, which is fulcrumed therein, and this frame is fitted longitudinally on and secured to the latch-bar 5. The bar 5 fits longitudinally in the seat or socket 8 on the under side of the treadle-frame and between the longitudinal side walls of said socket, which form abutments, preventing lateral movement of said frame on said bar. The treadle-frame is secured to the bar 5 by a single rivet 16 or other suitable means passed through the bar and through an intermediate portion in the length of the web 7. The edge walls of the socket 8, engaging the side edges of bar 5, hence hold said treadle-frame against rocking movement on the single securing-rivet 16, and hence maintain the treadle always in the proper alinement with the latch.

The treadle and guard are so arranged that when the treadle is in set position locking the latch the top surface of the treadle will be inclined forwardly and upwardly from the latch with the treadle-plate a distance above the top edge of the annular guard-wall. Hence I have formed the front portion of the depending flange of greater length than the remaining portion thereof, so as to always close the space within said guard. It is desirable to have the treadle thus arranged when set a distance above the guard, so as to be readily engaged by the animal and so that the guard-frame will in no way prevent the foot of the animal from operatively engaging the treadle when in set position. I have also so arranged the treadle and guard-frame that the treadle in its downward movement will release the latch just before the treadle reaches the horizontal position—that is, just before the top surface of the treadle reaches a position flush with the top edge of the guard. The slightest pressure of the animal's foot will hence quickly and easily depress the treadle and spring the trap.

It is essential to the successful operation of traps when placed under water or covered that all parts of the trigger be positively guarded against the entrance of foreign material beneath the same, and by my invention I have provided an exceedingly simple and durable device which effectively accomplishes these desirable results.

My improved treadle frame and guard, with its treadle, can be applied to traps on the market by removing the treadle and attachments from such traps.

What I claim is—

1. An animal-trap treadle and guard-frame comprising a bottom web and an upwardly-extending guard-wall comprising an annular portion and two spaced laterally-extending portions, in combination with a treadle fitting within said walls and covering and closing the space within the same, said treadle comprising an arm fitting and fulcrumed between said laterally-extending portions of the guard-wall and a plate covering the space within said annular portion and having a depending flange within said annular portion and closing the same.

2. An animal-trap treadle and guard-frame comprising a bottom web having a longitudinal seat or socket on its under face to receive a part of the trap-frame, and a vertically-disposed encircling guard-wall having its two ends extended rearwardly and forming the parallel spaced guard-wall extensions, in combination with a vertically-movable treadle fitted and movable vertically within said wall and entirely covering and closing the space within the same, said treadle being pivoted to and between said walls.

3. In an animal-trap, in combination, the trap-frame, jaws and latch, a treadle frame and guard secured on the trap-frame and comprising an encircling guard-wall having its rear ends extended rearwardly, and a vertically-movable treadle closing and covering the space within said wall, and comprising a plate having a depending flange and an arm fulcrumed between said extended rear ends of said wall and covering the space between the same, said treadle being arranged on its downward movement to release said latch before the top face of the treadle reaches a position flush with the top edge of said wall.

4. In an animal-trap, a trap-frame, jaws, and latch, said frame comprising a bar carrying said latch, in combination with a treadle frame and guard having a seat on its under side formed with longitudinal abutments fitting the side edges of said bar, a single rivet securing said treadle-frame on said bar, said treadle-frame having a vertical upwardly-beveled encircling guard-wall with its ends extended rearwardly, and a treadle covering and closing the space within said wall and having its arm fulcrumed between and guarded by said extended wall ends, the treadle-plate having an annular depending beveled flange fitting within said wall and of greater length at the front portion of the plate.

In testimony whereof I affix my signature in presence of two witnesses.

CHARLES WESLEY HOWE.

Witnesses:
W. M. BATES,
C. L. McNEILL.